3,182,016
HYDROGENATION PROCESS EMPLOYING
TUBULAR CATALYTIC STRUCTURE
Edward L. Cole, Glenham, and Edwin C. Knowles, Poughkeepsie, N.Y., assignors to Texaco Inc., New York, N.Y., a corporation of Delaware
No Drawing. Filed Mar. 16, 1961, Ser. No. 96,079
9 Claims. (Cl. 208—264)

This invention relates to the treatment of a hydrocarbon and, more particularly, to the hydrogenation of a hydrocarbon in the presence of an improved catalyst. This application is a continuation-in-part of our United States application, Serial No. 79,112, filed December 29, 1960.

Catalytic hydrogenation of hydrocarbons is known in the art, and may be carried out over a wide range of operating conditions. For example, temperatures of from about 400° to 800° F. and pressures of from about 300 to 10,000 p.s.i.g. may be used. Thus, for example, hydrogenation of a lubricating oil carried out in the presence of hydrogen and a suitable catalyst, may be conducted under relatively mild conditions for the purpose of improving the color characteristics of the lubricating oil. On the other hand, more severe conditions may be employed where it is desirable to effect the hydrogenation of the feed charge or where it is desirable to crack out unsuitable components. Still further, hydrogenation may be employed to remove oxygen, nitrogen and sulfur constituents from petroleum fractions.

During catalytic processing with solid particulate catalyst, the reactants are passed through a bed of porous catalyst particles, beads or pellets. In many such reactions employing organic materials at elevated temperatures, a carbonaceous deposit accumulates in the pores and openings of the catalyst as the process proceeds under continuous operating conditions. This deposition of carbonaceous material, commonly known as fouling of the catalyst, is a function of the reactants, the reaction products, the conditions of the process, and the catalyst, and certain types of reactions may be worse offenders than others. Fouling may be particularly excessive when the reactants or products remain in contact with the catalyst for a relatively long time. When a porous catalyst is used, the reactants diffuse into the interior or central portion of the catalyst particle and may be retained for an excessive period of time whereupon decomposition of the reactants and products result in fouling of catalyst. Fouling results not only in a decrease in catalyst activity and loss in selectivity, but also results in intensification of the heat transfer problem in the catalyst bed, thereby resulting in local overheating or "hot spots," particularly during regeneration of the catalyst. Local overheating and temperature variations in the catalyst bed are deleterious and may result not only in excessive coking of the reactants and inactivation of the catalyst, but also cause undesired side reactions.

This invention has therefore as its purpose to provide a catalytic structure suitable for use in the hydrogenation of a hydrocarbon and devoid of the foregoing disadvantages, and characterized by relatively high activity over long periods of use. The catalytic structure of this invention for use in hydrogenation reactions is provided with an extended substrate having deposited thereon an active catalyst material which affords an effective means for minimizing, or substantially eliminating, local overheating and fouling in the catalyst bed. Equally important, our catalytic structure is not restricted to any particular configuration, and may comprise the walls of the reactor thereby obviating the need for employing a packed column of catalyst. As a result, the quantity of active catalyst material used in our catalytic structure is greatly reduced as compared to the quantity required in conventional structures. This eliminates a substantial portion of the structural and supporting members of the reactor, permits compactness in design and decreases substantially the capital costs and operating costs. It is significant that the foregoing and other objects are realized without diminishing the flow rates of the reactants, but, on the contrary, the reaction rates may be greatly increased without any appreciable decrease in product yield. These together with other objects and advantages will be apparent to one skilled in the art upon reading the following description.

The novel catalytic structure of our invention involves broadly an extended substrate having deposited thereon a catalyst material, which material may be deposited in a form possessing catalytic activity or capable of being rendered susceptible of catalytic activity by subsequent treatment, as explained more fully hereinbelow. Depending to a large extent upon the catalyst material employed, our invention was found to be extremely advantageous and economical for use in hydrogenation processes conducted either in liquid or vapor phase.

The extended substrate, as employed herein, and in the appended claims, is defined as a substrate of extended dimensions and is particularly of a length and geometric surface area substantially greater than that of discrete particles. The extended substrate is not less than about ⅛-inch in its maximum dimension, and more preferably ¼-inch, and of sufficient thickness to provide the required physical strength.

The catalytic structure is formed in accordance with our invention by chemically reducing a solution containing a soluble compound of the catalyst material in the presence of an extended substrate under such conditions as to effect a substantially uniform deposition of the catalyst material upon the substrate. Although the exact form of the deposits cannot be determined, it is believed that the material is deposited as elemental metal or its intermediate product of reduction, such as the oxide. Chemical reduction of the deposit is particularly applicable to those metals whose salts or compounds in solution form a soluble complex with a suitable stabilizing agent such as complexing agents which form soluble complex ions of the coordinate complex type, sequestering agents, chelating agents, dispersants and detergents. Salts of numerous metals form with ammonia, for example, a soluble complex ion. The metal complex may be readily reduced to the elemental form, or its intermediate product of reduction, with a suitable reducing agent, hereafter described in greater detail. As shown in the parent application, metals from Groups I, VI and VIII of the Periodic Table of Elements, for example, copper, silver, gold, chromium, tungsten, molybdenum, iron, nickel, osmium, platinum and palladium are generally suitable for use in the present process. Other elemental metals, including many from Groups II, III, IV, V and VII of the Periodic Table, for example, zinc, aluminum, tin, zirconium, titanium, vanadium, tantalum and manganese, can also be used. Among these are many known and useful hydrogenation catalysts.

The non-metallic ion or anion of the metal compound or salt to be precipitated from the ammoniacal solution may be of the more common inorganic or organic acids which form soluble salts of the metal. Also, the anion should not be reduced under precipitation conditions. Those anions usually employed include sulfate, chloride, nitrate, carbonate and acetate. The solvent generally used is water to form an aqueous solution of the metal complex, but suitable organic solvents for the metal salts, including alcohols, aldehydes, ethers, ketones, toluene and pyridine may be useful as may be liquid ammonia.

Although ammonia is the preferred stabilizing agent and the invention is described in greater detail in connection with solutions of this type, certain other stabilizing agents may be employed. Other suitable stabilizing agents include the organic primary, secondary and tertiary amines, such as methyl amine, ethylenediamine and diethylenetriamine. In addition, complexing agents may include phosphates, especially pyrophosphate and metaphosphate, as well as citrate, acetate, oxalate, tartrate, o-phenanthroline, thiocyanate, thiosulfate, thiourea, pyridine, quinoline and cyano groups. Still further useful complex formations include the chloro, hydroxo and aquo complexes, such as the aquo-ammonia complexes. Olefin and olefin-like compounds are also useful and may include, for example, ethylene, propylene, butadiene, etc., as well as the unsaturated cyclo compounds, such as cyclohexene and styrene. However, the olefin and olefin-like compounds are desirably employed in a non-aqueous solvent, for example, benzene, toluene, pyridine, acetone and ether.

The concentration of the particular metal in solution will depend to a considerable extent upon the metal employed. Generally, there appears to be no benefit from employing concentrations in excess of about 5 mols, but the concentration of a metal in solution should be less than that at which a substantial amount will precipitate out in particulate form which may be determined by experiment by one skilled in the art. A concentration of less than about 0.01 mol is usually too low for effecting reduction within a reasonable period of time. We have found a concentration of 0.5 to 2 mols to be generally satisfactory, but with the more rare or expensive elements, such as platinum, the concentration may advantageously be as low as 0.04 mol.

The elemental metal, or its intermediate product of reduction, is plated onto the extended substrate from the solution of the dissolved metal salt by treating the solution with a reducing agent, preferably a reducing gas, in the presence of the substrate. In the preferred embodiment of our invention, the substrate is immersed or otherwise contacted with the solution containing a soluble compound of the catalyst material, and the solution pressured with hydrogen at an effective reduction temperature, often at elevated temperatures and under superatmospheric pressures. The temperature and pressures employed in the reducing step depend to some extent upon the material undergoing reduction and may vary over a wide range. Thus, for example, platinum may be deposited from ethylene chloroplatinate in benzene by reduction with hydrogen at room temperature and atmospheric pressure. However, with numerous other metals, reduction proceeds advantageously at elevated temperatures which may range up to about 500° F., and under a partial pressure of reducing gas of as high as 4,000 pounds per square inch or higher. Although higher temperatures and pressures may increase slightly the rate of the reduction reaction, this increase generally is not significant.

It should be understood that other reducing gases, such as carbon monoxide, may be used with satisfactory results, as may other reducing agents, for example, hydrazine, hydroxylamine, glyoxal, formaldehyde, or sulfur dioxide.

The extended substrate employed in a catalytic structure formed in accordance with our invention is not restricted to any particular configuration nor to any particular material. The substrate may be formed of a metal or a non-metal suitable for use in a catalytic reactor and may include such material as aluminum, steel, stainless steel, nickel or titanium, including sintered metal materials, or refractory materials including, for example, refractory metal oxides, e.g. alumina, magnesia, silica, or refractory metal silicates or carbides. The configuration of the extended substrate may include bars, balls, chain, mesh, plates, saddles, sheet, tubes, wire or the like.

By way of example, a deposit of nickel or molybdenum may be formed on the oxide film of the substrate from an ammoniacal solution of a salt of the metal by reducing the solution with hydrogen at elevated temperature and pressure. The deposit may be sulfided with hydrogen sulfide gas at elevated temperature and the sulfide catalyst formed then may be used in the hydrogenation of hydrocarbons. A mixture of metal salts, all of which form complex ions with ammonia, may be used for forming a deposit of more than one catalytic element. By such means, a nickel-molybdenum catalyst or cobalt-molybdenum-nickel catalyst may be deposited on the oxide film for use as hydrogenation catalyst. Also, nickel-molybdenum or nickel-tungsten salts may be complexed in a citrate solution, and precipitated from solution with hydrogen as described above. The co-deposits may then be calcined or otherwise activated.

In order to assure deposition of the desired quantity of the catalyst material, it may be necessary in some cases to repeat the particular process employed in depositing the material including the successive steps of deposition, and drying or activation where required. Depending on the added catalyst deposit and its intended use, the substrate may be substantially inert catalytically, or it may have a synergistic effect upon the catalyst material. It should be understood that a suitable promoter or inhibitor may be added to the catalyst material, or incorporated with the reactants undergoing catalytic treatment.

It will be observed that the deposited film of metal as catalyst material formed on an extended substrate in accordance with our invention defines the depth of the catalyst layer and therefore limits the extent of diffusion of the reactants through the pores or openings in the catalyst material to this shallow depth. As a consequence, substantially all of the active catalyst is exposed to the reactants, and excessive residence time, or entrapment, of the reactants is minimized or substantially eliminated. In this manner, we readily achieve with less catalyst material a reactive capacity equal to, or greater than, that accomplished by conventional catalyst.

In a preferred embodiment of our invention, the catalytic structure is provided in the form of a metal tube of relatively small inside diameter. The inside diameter of tube, in general, may range from about 0.05 to 0.5 inch, but is dependent upon the specific catalytic reaction involved, the material undergoing reaction, and the capacity of the pumping mechanism to accomplish sufficient turbulence. The added catalyst material is deposited on at least one wall surface of the tube, and advantageously on the interior wall of the tube. The tube through which the reactants pass is preferably of a continuous length sufficient to accomplish the desired catalytic reaction in economic yields, but may be coiled to conserve space. The length of the tube may depend to some extent upon the reaction contemplated, and therefore may be readily determined by one skilled in the art. The wall of the reactor provides adequate support and mechanical strength for the catalyst, and thereby affords a substantially self-sustaining structure. Packed reaction columns are eliminated as are many of the structural and supporting features employed in a conventional catalytic reactor.

It will be observed that the metal tube provides an adequate means to control the temperature of heat transfer to or from the catalyst. The metal wall, being a good heat conductor, may be employed as a heat exchanger. A suitable heat exchange medium may be applied to the exterior wall of the metal tube. During processing, the heat evolved in the catalyst bed is readily conducted by the wall of the tube to the surroundings where it is adsorbed and dissipated by the heat exchange medium. On the other hand, the tubular wall may be employed for supplying heat from a heating medium to the reactor or reaction medium. This invention also contemplates that the catalyst material may be deposited on the exterior wall surface of the tube, and the heat exchange medium passed through the interior thereof. It should be understood that in an economic and commercial operation, a number of the catalytic tubes may be housed in a single unit in parallel and arranged in contacting relation with a heat exchange medium.

It is of further significance that in the catalytic tube having a relatively small inside diameter, highly turbulent flow of the reactants passing through the tube is readily maintained. As a consequence, near maximum reaction rates are achieved. In addition, the catalytic structure of our invention markedly reduces the residence time of the reactants in the reactor, as explained above. Consequently, the reactor may be operated at high temperatures, or optimum temperatures, or, more important, in many cases at higher temperatures in order to take advantage of faster rates than those normally encountered in a conventional reactor, without danger of excessive coking or fouling of the catalyst.

The catalytic tube or sheet formed in accordance with the invention is of further advantage in that the reactant gases may be caused to pass through the tube or sheet by use of a pervious or permeable tube or sheet, optionally with the application of a pressure differential between the interior and exterior of the tube or opposite sides of the sheet. A porous tube or wall may be formed from powdered metal, preferably sintered, by known procedures in the field of powder metallurgy. Thus, in a hydrogenation process, hydrogen may be diffused through the tube and into immediate contact with the catalyst surface where reaction occurs, thereby more fully utilizing the reactants and increasing the reaction rates. On the other hand, the reactant gases may be caused to pass in or out of the catalyst tube through the permeable wall of the tube.

The following examples will further illustrate our invention.

EXAMPLE I

Nickel chips measuring approximately ¼-inch by ⅟₁₆-inch x ⅟₁₆-inch were impregnated with a cobalt-molybdenum-nickel catalyst as follows: A solution of the catalyst forming material was prepared by adding to 1,500 milliliters of water, 112 grams of nickel sulfate hexahydrate, 73 grams of cobalt sulfate heptahydrate, 89 grams of ammonium molybdate tetrahydrate and 100 grams of ammonium sulfate. The mixture was heated at 180° F. and 500 milliliters of ammonium hydroxide (28.7% by weight NH$_4$OH) was added with stirring to dissolve all the salts.

146.83 grams of nickel chips were placed in a glass tube and covered with 200 milliliters of the above catalyst solution. The tube was placed in an autoclave, flushed with hydrogen, and then pressurized with hydrogen at 1,100 p.s.i.g., at 350° F. and for 5 hours. The autoclave was depressurized, cooled to room temperature, and the treated nickel chips removed. The nickel chips were dried at 160° F. for 2 hours, and then calcined at 750° F. for 2 hours in air. The net gain in weight of the nickel chips was 12.44 grams.

The prepared nickel chips, having the catalyst imbedded thereon, were used as a catalyst in a fixed bed reactor for a hydrogenation process. A wax distillate lubricating oil fraction obtained upon distillation of a Mid-Continent paraffinic crude which had been furfural refined to remove a substantial portion of aromatics was employed as the charge stock. Table I, below, shows the conditions for the process.

Table I

| | |
|---|---|
| Pressure, p.s.i.g. | 1125 |
| Reactor temperature, °F. | 575 |
| Liquid space velocity, v./v./hr. | 0.81 |
| Recycle rate of gas (from high pressure separator), s.c.f./bbl. | 5000 |

The color of the charge stock was reduced from 225, as measured on a Lovibond colorimeter employing a 6-inch cell, to 25 Lovibond with a 6-inch cell in the final product. In addition, the sulfur content in the charge stock was reduced from 0.42% by weight to 0.15% in product.

EXAMPLE II

Porex, a porous bronze metal prepared from powdered bronze and manufactured by Moraine Products Division of General Motors, was impregnated with the cobalt-molybdenum-nickel catalyst used in Example I. 1,323 grams of Porex was impregnated with the catalyst by the method employed in Example I, and the treated material used in the hydrogenation of the wax distillate fraction similar to that used in Example I. The conditions for the treatment are shown in Table II, below.

Table II

| | |
|---|---|
| Pressure, p.s.i.g. | 1000 |
| Reactor temperature, °F. | 654 |
| Liquid space velocity, v./v./hr. | 1.55 |
| Recycle rate of gas, s.c.f./bbl. | 5000 |

The charge stock had a color of 75 Lovibond ½-inch cell, while the color of the final product measured 60 Lovibond 6-inch cell.

EXAMPLE III

Alumina pellets, measuring approximately ⅛-inch in diameter, the total weight of the pellets being 119 grams, were impregnated with the catalyst material of Example I and by substantially the same method as that employed in Example I. The impregnated pellets were calcined for 5 hours at 750° F. in air. The net gain in weight was 9 grams. A wax distillate fraction similar to that used in Example I was hydrogenated, the conditions for which are shown in Table III, below.

Table III

| | |
|---|---|
| Pressure, p.s.i.g. | 1225 |
| Reactor temperature, °F. | 624 |
| Liquid space velocity, v./v./hr. | 0.80 |
| Recycle rate of gas, s.c.f./bbl. | 10,000 |

The color was improved from 55 Lovibond ½-inch cell to 10 Lovibond 6-inch cell.

We claim:

1. A process for the hydrogenation of hydrocarbons which comprises contacting said hydrocarbons with hydrogen at an elevated temperature and pressure in the presence of a catalytic structure consisting essentially of an extended substrate of length and surface area substantially greater than that of discrete particles, and a catalyst material deposited on said extended substrate by chemical reduction from a solution containing a soluble compound of said catalyst material in the presence of said substrate.

2. The process according to claim 1 wherein said hydrogenation catalyst is a cobalt-molybdenum-nickel catalyst.

3. The process according to claim 1 wherein said hydrocarbon is a lubricating oil.

4. A process for the hydrogenation of hydrocarbons which comprises contacting said hydrocarbons with hydrogen at an elevated temperature and pressure in the presence of a catalytic structure consisting essentially of an extended substrate of length and surface area substantially greater than that of discrete particles, and a catalyst material deposited on said substrate by immersing said substrate in a solution containing a soluble compound of said catalyst material pressuring said solution with hydrogen and maintaining said solution at an effective reduction temperature thereby depositing a substantially uniform film of said catalyst material on said substrate.

5. A process for the hydrogenation of hydrocarbons which comprises contacting said hydrocarbons with hydrogen at an elevated temperature and pressure in the presence of a catalytic structure consisting essentially of an extended substrate of length and surface area substantially greater than that of discrete particles, and a catalyst material deposited on said substrate by immersing said substrate in an ammoniacal solution containing a soluble compound of said catalyst material, pressuring said solution with hydrogen and maintaining said solution at an elevated temperature thereby depositing a substantially uniform film of said catalyst material on said substrate.

6. A process for the hydrogenation of hydrocarbons which comprises contacting said hydrocarbons with hydrogen at an elevated temperature and pressure in the presence of a catalytic structure consisting essentially of an extended metal tubular substrate of relatively small diameter for passage therethrough of reactants undergoing hydrogenation, and an added catalyst material deposited on the interior wall surface of said tubular substrate by chemical reduction from a solution containing a soluble compound of said catalyst material in the presence of said substrate.

7. A process for the hydrogenation of hydrocarbons which comprises contacting said hydrocarbons with hydrogen at an elevated temperature and pressure in the presence of a catalytic structure consisting essentially of an extended metal tubular substrate of relatively small diameter for passage therethrough of reactants undergoing hydrogenation, and an added catalyst material deposited on the interior wall surface of said tubular substrate by contacting said interior wall surface with an ammoniacal solution containing a soluble compound of said catalyst material, pressuring said solution with hydrogen and maintaining said solution at an effective reduction temperature thereby depositing a substantially uniform film of said catalyst material on said interior wall surface.

8. The process according to claim 1 wherein said substrate is a metal.

9. The process according to claim 1 wherein said substrate is a non-metal.

References Cited by the Examiner
UNITED STATES PATENTS

| | | | |
|---|---|---|---|
| 2,526,657 | 10/50 | Guyer | 252—477 |
| 2,890,160 | 6/59 | Anderson et al. | 208—143 |
| 2,930,767 | 3/60 | Novak | 252—477 |
| 2,974,150 | 3/61 | McClements et al. | 252—477 |

ALPHONSO D. SULLIVAN, *Primary Examiner.*